(12) United States Patent
Jeddeloh

(10) Patent No.: US 7,562,178 B2
(45) Date of Patent: *Jul. 14, 2009

(54) MEMORY HUB AND METHOD FOR MEMORY SEQUENCING

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/069,197

(22) Filed: Feb. 8, 2008

(65) Prior Publication Data

US 2008/0133853 A1 Jun. 5, 2008

Related U.S. Application Data

(63) Continuation of application No. 11/580,424, filed on Oct. 12, 2006, now Pat. No. 7,353,320, which is a continuation of application No. 10/846,988, filed on May 14, 2004, now Pat. No. 7,162,567.

(51) Int. Cl.
G06F 12/00 (2006.01)

(52) U.S. Cl. .......................... 711/5; 711/105; 711/115

(58) Field of Classification Search ........................ None
See application file for complete search history.

(56) References Cited

U.S. PATENT DOCUMENTS

| | | | |
|---|---|---|---|
| 4,045,781 A | 8/1977 | Levy et al. | 364/200 |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,707,823 A | 11/1987 | Holdren et al. | 370/1 |
| 4,724,520 A | 2/1988 | Athanas et al. | 364/200 |
| 4,930,128 A | 5/1990 | Suzuki et al. | 371/12 |
| 4,953,930 A | 9/1990 | Ramsey et al. | 350/96.11 |
| 5,133,059 A | 7/1992 | Ziegler et al. | 395/425 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 395/275 |
| 5,269,022 A | 12/1993 | Shinjo et al. | 395/700 |

(Continued)

FOREIGN PATENT DOCUMENTS

EP 0395559 A2 10/1990

(Continued)

OTHER PUBLICATIONS

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

(Continued)

*Primary Examiner*—Kevin Verbrugge
(74) *Attorney, Agent, or Firm*—Dorsey & Whitney LLP

(57) ABSTRACT

A memory module includes a memory hub coupled to several memory devices. The memory hub includes at least one performance counter that tracks one or more system metrics—for example, page hit rate, prefetch hits, and/or cache hit rate. The performance counter communicates with a memory sequencer that adjusts its operation based on the system metrics tracked by the performance counter.

28 Claims, 3 Drawing Sheets

U.S. PATENT DOCUMENTS

| | | | |
|---|---|---|---|
| 5,317,752 A | 5/1994 | Jewett et al. | 395/750 |
| 5,319,755 A | 6/1994 | Farmwald et al. | 395/325 |
| 5,355,391 A | 10/1994 | Horowitz et al. | 375/36 |
| 5,432,823 A | 7/1995 | Gasbarro et al. | 375/356 |
| 5,432,907 A | 7/1995 | Picazo, Jr. et al. | 395/200 |
| 5,442,770 A | 8/1995 | Barratt | 395/403 |
| 5,461,627 A | 10/1995 | Rypinski | 370/95.2 |
| 5,465,229 A | 11/1995 | Bechtolsheim et al. | 345/477 |
| 5,465,343 A | 11/1995 | Henson et al. | 395/439 |
| 5,479,370 A | 12/1995 | Furuyama et al. | 365/189.12 |
| 5,497,476 A | 3/1996 | Oldfield et al. | 395/439 |
| 5,502,621 A | 3/1996 | Schumacher et al. | 361/760 |
| 5,544,319 A | 8/1996 | Acton et al. | 395/200.07 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,613,075 A | 3/1997 | Wade et al. | 395/287 |
| 5,638,334 A | 6/1997 | Farmwald et al. | 365/230.03 |
| 5,638,534 A | 6/1997 | Mote, Jr. | 395/485 |
| 5,659,713 A | 8/1997 | Goodwin et al. | 711/157 |
| 5,659,798 A | 8/1997 | Blumrich et al. | 395/846 |
| 5,715,456 A | 2/1998 | Bennett et al. | 395/652 |
| 5,729,709 A | 3/1998 | Harness | 395/405 |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,838,931 A | 11/1998 | Regenold et al. | 395/308 |
| 5,875,352 A | 2/1999 | Gentry et al. | 395/843 |
| 5,875,454 A | 2/1999 | Craft et al. | 711/113 |
| 5,887,159 A | 3/1999 | Burrows | 395/567 |
| 5,928,343 A | 7/1999 | Farmwald et al. | 710/104 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,006,340 A | 12/1999 | O'Connell | 713/600 |
| 6,023,726 A | 2/2000 | Saksena | 709/219 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,125,431 A | 9/2000 | Kobayashi | 711/154 |
| 6,128,703 A | 10/2000 | Bourekas et al. | 711/138 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,145,033 A | 11/2000 | Chee | 710/57 |
| 6,157,743 A | 12/2000 | Goris et al. | 382/233 |
| 6,157,962 A | 12/2000 | Hodges et al. | 710/1 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,212,590 B1 | 4/2001 | Melo et al. | 710/119 |
| 6,216,178 B1 | 4/2001 | Stracovsky et al. | 710/6 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,252,821 B1 | 6/2001 | Nizar et al. | 365/238.6 |
| 6,256,692 B1 | 7/2001 | Yoda et al. | 710/104 |
| 6,272,609 B1 | 8/2001 | Jeddeloh | 711/169 |
| 6,285,349 B1 | 9/2001 | Smith | 345/147 |
| 6,294,937 B1 | 9/2001 | Crafts et al. | 327/158 |
| 6,301,637 B1 | 10/2001 | Krull et al. | 711/112 |
| 6,327,642 B1 | 12/2001 | Lee et al. | 711/120 |
| 6,330,205 B2 | 12/2001 | Shimizu et al. | 365/230.06 |
| 6,330,639 B1 | 12/2001 | Fanning et al. | 711/106 |
| 6,347,055 B1 | 2/2002 | Motomura | 365/189.05 |
| 6,349,363 B2 | 2/2002 | Cai et al. | 711/129 |
| 6,356,573 B1 | 3/2002 | Jonsson et al. | 372/46 |
| 6,367,074 B1 | 4/2002 | Bates et al. | 717/11 |
| 6,370,068 B2 | 4/2002 | Rhee | 365/196 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,433,785 B1 | 8/2002 | Garcia et al. | 345/531 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,460,108 B1 | 10/2002 | McCoskey et al. | 710/310 |
| 6,460,114 B1 | 10/2002 | Jeddeloh | 711/120 |
| 6,462,978 B2 | 10/2002 | Shibata et al. | 365/63 |
| 6,463,059 B1 | 10/2002 | Movshovich et al. | 370/389 |
| 6,467,013 B1 | 10/2002 | Nizar | 711/1 |
| 6,470,422 B2 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B2 | 11/2002 | Kawata et al. | 438/109 |
| 6,490,188 B2 | 12/2002 | Nuxoll et al. | 365/63 |
| 6,496,193 B1 | 12/2002 | Surti et al. | 345/552 |
| 6,496,909 B1 | 12/2002 | Schimmel | 711/163 |
| 6,501,471 B1 | 12/2002 | Venkataraman et al. | 345/424 |
| 6,502,161 B1 | 12/2002 | Perego et al. | 711/5 |
| 6,505,287 B2 | 1/2003 | Uematsu | 711/170 |
| 6,523,092 B1 | 2/2003 | Fanning | 711/134 |
| 6,523,093 B1 | 2/2003 | Bogin et al. | 711/137 |
| 6,526,483 B1 | 2/2003 | Cho et al. | 711/154 |
| 6,539,490 B1 | 3/2003 | Forbes et al. | 713/401 |
| 6,552,564 B1 | 4/2003 | Forbes et al. | 326/30 |
| 6,553,476 B1 | 4/2003 | Ayaki et al. | 711/204 |
| 6,587,912 B2 | 7/2003 | Leddige et al. | 711/5 |
| 6,590,816 B2 | 7/2003 | Perner | 365/200 |
| 6,594,713 B1 | 7/2003 | Fuoco et al. | 710/31 |
| 6,594,722 B1 | 7/2003 | Willke, II et al. | 710/313 |
| 6,598,154 B1 | 7/2003 | Vaid et al. | 712/237 |
| 6,615,325 B2 | 9/2003 | Mailloux et al. | 711/154 |
| 6,622,227 B2 | 9/2003 | Zumkehr et al. | 711/167 |
| 6,628,294 B1 | 9/2003 | Sadowsky et al. | 345/568 |
| 6,629,220 B1 | 9/2003 | Dyer | 711/158 |
| 6,631,440 B2 | 10/2003 | Jenne et al. | 711/105 |
| 6,636,110 B1 | 10/2003 | Ooishi et al. | 327/565 |
| 6,646,929 B1 | 11/2003 | Moss et al. | 365/194 |

| Patent/Pub No. | Date | Inventor | Class |
|---|---|---|---|
| 6,647,470 B1 | 11/2003 | Janzen | 711/154 |
| 6,658,509 B1 | 12/2003 | Bonella et al. | 710/100 |
| 6,662,304 B2 | 12/2003 | Keeth et al. | 713/400 |
| 6,667,895 B2 | 12/2003 | Jang et al. | 365/63 |
| 6,681,292 B2 | 1/2004 | Creta et al. | 711/119 |
| 6,697,926 B2 | 2/2004 | Johnson et al. | 711/167 |
| 6,704,817 B1 | 3/2004 | Steinman et al. | 710/100 |
| 6,715,018 B2 | 3/2004 | Farnworth et al. | 710/300 |
| 6,718,440 B2 | 4/2004 | Maiyuran et al. | 711/137 |
| 6,721,195 B2 | 4/2004 | Brunelle et al. | 365/63 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,745,275 B2 | 6/2004 | Chang | 710/305 |
| 6,751,703 B2 | 6/2004 | Chilton | 711/113 |
| 6,754,117 B2 | 6/2004 | Jeddeloh | 365/201 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,775,747 B2 | 8/2004 | Venkatraman | 711/137 |
| 6,782,466 B1 | 8/2004 | Steele et al. | 711/209 |
| 6,788,104 B2 | 9/2004 | Singh et al. | 326/39 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/234 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,829,705 B2 | 12/2004 | Smith | 713/1 |
| 6,889,304 B2 | 5/2005 | Perego et al. | 711/170 |
| 6,928,528 B1 | 8/2005 | Hewitt | 711/156 |
| 6,941,433 B1 | 9/2005 | Libby et al. | 711/167 |
| 6,980,042 B2 | 12/2005 | LaBerge | 327/291 |
| 7,107,415 B2 | 9/2006 | Jeddeloh et al. | 711/154 |
| 7,117,316 B2 | 10/2006 | Jeddeloh | 711/154 |
| 7,120,727 B2 | 10/2006 | Lee et al. | 711/5 |
| 7,133,972 B2 | 11/2006 | Jeddeloh | 711/137 |
| 7,162,567 B2 | 1/2007 | Jeddeloh | 711/5 |
| 7,188,219 B2 | 3/2007 | Jeddeloh | 711/154 |
| 7,254,075 B2 | 8/2007 | Woo et al. | 365/207 |
| 7,315,053 B2 | 1/2008 | Hosomi et al. | 257/295 |
| 7,318,130 B2 | 1/2008 | Morrow et al. | 711/154 |
| 7,343,444 B2 | 3/2008 | Lee et al. | 711/5 |
| 2001/0039612 A1 | 11/2001 | Lee | 713/2 |
| 2002/0002656 A1 | 1/2002 | Honma et al. | 711/122 |
| 2002/0078298 A1 | 6/2002 | Jeddeloh | 711/118 |
| 2002/0112119 A1 | 8/2002 | Halbert et al. | 711/115 |
| 2002/0116588 A1 | 8/2002 | Beckert et al. | 711/161 |
| 2002/0120709 A1 | 8/2002 | Chow et al. | 709/213 |
| 2002/0144064 A1 | 10/2002 | Fanning | 711/144 |
| 2002/0178319 A1 | 11/2002 | Sanchez-Olea | 710/305 |
| 2003/0005223 A1 | 1/2003 | Coulson et al. | 711/118 |
| 2003/0014578 A1 | 1/2003 | Pax | 710/100 |
| 2003/0043158 A1 | 3/2003 | Wasseman et al. | 345/545 |
| 2003/0043426 A1 | 3/2003 | Baker et al. | 359/109 |
| 2003/0093630 A1 | 5/2003 | Richard et al. | 711/154 |
| 2003/0156639 A1 | 8/2003 | Liang | 375/240.01 |
| 2003/0158995 A1 | 8/2003 | Lee et al. | 711/105 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0223295 A1 | 12/2003 | Ozguz et al. | 365/201 |
| 2003/0227798 A1 | 12/2003 | Pax | 365/189.12 |
| 2003/0229762 A1 | 12/2003 | Maiyuran et al. | 711/137 |
| 2003/0235072 A1 | 12/2003 | Kim et al. | 365/158 |
| 2004/0006671 A1 | 1/2004 | Handgen et al. | 711/137 |
| 2004/0015666 A1 | 1/2004 | Rojas et al. | 711/159 |
| 2004/0019728 A1 | 1/2004 | Sharma | 710/306 |
| 2004/0022094 A1 | 2/2004 | Radhakrishnan et al. | 365/200 |
| 2004/0024959 A1 | 2/2004 | Taylor | 711/105 |
| 2004/0034753 A1 | 2/2004 | Jeddeloh | 711/163 |
| 2004/0034825 A1 | 2/2004 | Jeddeloh | 714/733 |
| 2004/0039886 A1 | 2/2004 | Christofferson et al. | 711/156 |
| 2004/0044833 A1 | 3/2004 | Ryan | 711/5 |
| 2004/0049649 A1 | 3/2004 | Durrant | 711/165 |
| 2004/0064602 A1 | 4/2004 | George | 710/22 |
| 2004/0122988 A1 | 6/2004 | Han et al. | 710/5 |
| 2004/0126115 A1 | 7/2004 | Levy et al. | 398/116 |
| 2004/0144994 A1 | 7/2004 | Lee et al. | 257/200 |
| 2004/0158677 A1 | 8/2004 | Dodd | 711/118 |
| 2004/0170196 A1 | 9/2004 | Susnow | 370/503 |
| 2004/0260909 A1 | 12/2004 | Lee et al. | 711/213 |
| 2004/0268061 A1 | 12/2004 | Khare et al. | 711/151 |
| 2005/0060533 A1* | 3/2005 | Woo et al. | 713/100 |
| 2005/0066137 A1 | 3/2005 | Jeddeloh et al. | 711/154 |
| 2005/0071542 A1 | 3/2005 | Weber et al. | 711/105 |
| 2005/0078506 A1 | 4/2005 | Rao et al. | 365/154 |
| 2005/0105350 A1 | 5/2005 | Zimmerman | 365/201 |
| 2005/0149774 A1 | 7/2005 | Jeddeloh et al. | 713/500 |
| 2005/0216678 A1 | 9/2005 | Jeddeloh | 711/154 |
| 2005/0223161 A1 | 10/2005 | Jeddeloh | 711/105 |
| 2005/0246558 A1 | 11/2005 | Ku | 713/300 |
| 2005/0286506 A1 | 12/2005 | LaBerge | 370/363 |
| 2006/0085616 A1 | 4/2006 | Zeighami et al. | 711/167 |
| 2006/0168407 A1 | 7/2006 | Stern | 711/154 |
| 2006/0200642 A1 | 9/2006 | LaBerge | 711/167 |
| 2006/0206679 A1 | 9/2006 | Jeddeloh et al. | 711/167 |
| 2006/0212655 A1 | 9/2006 | Jeddeloh | 711/154 |
| 2006/0212666 A1 | 9/2006 | Jeddeloh | 710/1 |
| 2006/0288172 A1 | 12/2006 | Lee et al. | 711/137 |
| 2007/0055817 A1 | 3/2007 | Jeddeloh | 711/104 |
| 2007/0113027 A1 | 5/2007 | Jeddeloh | 711/154 |
| 2007/0271435 A1 | 11/2007 | Jeddeloh et al. | 711/167 |

FOREIGN PATENT DOCUMENTS

| | | |
|---|---|---|
| EP | 0843261 A2 | 5/1998 |
| EP | 0849685 A2 | 6/1998 |
| GB | 2244157 A | 11/1991 |
| JP | 06-004401 | 1/1994 |
| JP | 06-028180 | 2/1994 |
| JP | 08-185383 | 7/1996 |
| JP | 10-228413 | 8/1998 |
| JP | 2001265539 A | 9/2001 |
| WO | WO 93/19422 | 9/1993 |
| WO | 97-04401 | 2/1997 |
| WO | 99-23570 | 5/1999 |
| WO | 99-34294 | 7/1999 |
| WO | 00-43902 | 7/2000 |
| WO | WO 02/27499 A2 | 4/2002 |

OTHER PUBLICATIONS

Intel, "Flash Memory PCI Add-In Card for Embedded Systems", Application Note AP-758, Sep. 1997, pp. i-13.

Intel, "Intel 840 Chipset: 82840 Memory Controller Hub (MCH)", Datasheet, www.intel.com/design/chipsets/datashts/298020.htm, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Shanley, T. et al., "PCI System Architecture", Third Edition, Mindshare, Inc., 1995, pp. 24-25.

* cited by examiner

MEMORY HUB AND METHOD FOR MEMORY SEQUENCING

CROSS-REFERENCE TO RELATED APPLICATIONS

This application is a continuation of U.S. patent application Ser. No. 11/580,424, filed Oct. 12, 2006, which is a continuation of U.S. patent application Ser. No. 10/846,988, filed May 14, 2004, U.S. Pat. No. 7,162,567.

TECHNICAL FIELD

This invention relates to computer systems, and, more particularly, to a computer system having a memory hub coupling several memory devices to a processor or other memory access device.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled to several memory modules, each of which includes a memory hub coupled to several memory devices. The memory hub efficiently routes memory requests and responses between the controller and the memory devices. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor.

Although computer systems using memory hubs may provide superior performance, they nevertheless often fail to operate at optimum speed for several reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems.

One technique that has been used to reduce latency in memory devices is to prefetch data, i.e., read data from system memory before the data are requested by a program being executed. Generally the data that are to be prefetched are selected based on a pattern of previously fetched data. The pattern may be as simple as a sequence of addresses from which data are fetched so that data can be fetched from subsequent addresses in the sequence before the data are needed by the program being executed. The pattern, which is known as a "stride," may, of course, be more complex.

Further, even though memory hubs can provide computer systems with a greater memory bandwidth, they still suffer from throughput problems. For example, before data can be read from a particular row of memory cells, that digit lines in the array are typically precharged by equilibrating the digit lines in the array. The particular row is then opened by coupling the memory cells in the row to a digit line in respective columns. A respective sense amplifier coupled between the digit lines in each column then responds to a change in voltage corresponding to the data stored in respective memory cell. Once the row has been opened, data can be coupled from each column of the open row by coupling the digit lines to a data read path. Opening a row, also referred to as a page, therefore consumes a finite amount of time and places a limit on the memory throughput.

Finally, the optimal decision of whether or not to prefetch data (and which data to prefetch), as well as whether or not to precharge or open a row, and whether or not to cache accessed data, may change over time and vary as a function of an application being executed by a processor that is coupled to the memory hub.

There is therefore a need for a computer architecture that provides the advantages of a memory hub architecture and also minimize the latency and/or throughput problems common in such systems, thereby providing memory devices with high bandwidth, high throughput, and low latency. Such a system would also desirably allow the operation of the memory hub to change over time.

SUMMARY OF THE INVENTION

According to one aspect of the invention, a memory module and method is provided including a plurality of memory devices and a memory hub. The memory hub contains a link interface, such as an optical input/output port, that receives memory requests for access to memory cells in at least one of the memory devices. The memory hub further contains a memory device interface coupled to the memory devices, the memory device interface being operable to couple memory requests to the memory devices for access to memory cells in at least one of the memory devices and to receive read data responsive to at least some of the memory requests. The memory hub further contains a performance counter coupled to the memory device interface, the performance counter operable to track at least one metric selected from the group consisting of page hit rate, prefetch hits, and cache hit rate. The memory hub further contains a memory sequencer coupled to the link interface and the memory device interface. The memory sequencer is operable to couple memory requests to the memory device interface responsive to memory requests received from the link interface. The memory sequencer is further operable to dynamically adjust operability responsive to the performance counter. For example, the performance counter may track page hit rate and the memory sequencer may change a number of open pages in the memory device or switch to an auto-precharge mode responsive to the tracked page hit rate. Alternatively, the performance counter may track a percentage of prefetch hits, and the memory sequencer may enable prefetching or disable prefetching or adjust the number of prefetch requests as a function of the tracked prefetch hit percentage. As a further example, the performance counter may track a cache hit rate, and the memory sequencer may disable the cache as a function of the tracked cache hit rate.

DETAILED DESCRIPTION OF THE INVENTION

Figure 1:
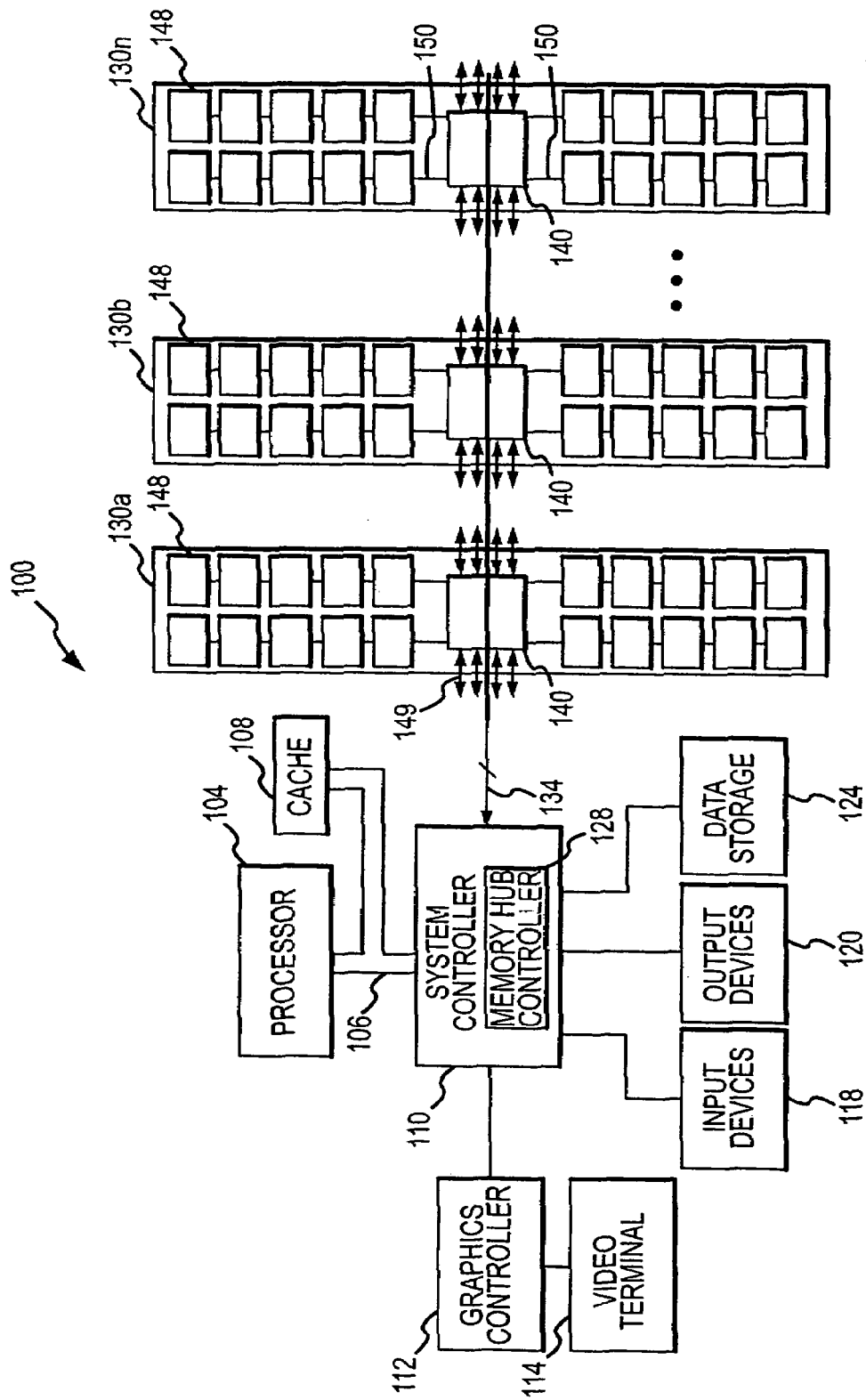
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 is coupled to several memory modules 130a,b . . . n, which serve as system memory for the computer system 100. The memory modules 130 are preferably coupled to the system controller 110 through a high-speed link 134, which may be an optical or electrical communication path or some other type of communications path. In the event the high-speed link 134 is implemented as an optical communication path, the optical communication path may be in the form of one or more optical fibers, for example. In such case, the system controller 110 and the memory modules will include an optical input/output port or separate input and output ports coupled to the optical communication path. The memory modules 130 are shown coupled to the system controller 110 in a multi-drop arrangement in which the single high-speed link 134 is coupled to all of the memory modules 130. However, it will be understood that other topologies may also be used, such as a point-to-point coupling arrangement in which a separate high-speed link (not shown) is used to couple each of the memory modules 130 to the system controller 110. A switching topology may also be used in which the system controller 110 is selectively coupled to each of the memory modules 130 through a switch (not shown). Other topologies that may be used will be apparent to one skilled in the art.

Each of the memory modules 130 includes a memory hub 140 for controlling access to 32 memory devices 148, which, in the example illustrated in FIG. 1, are synchronous dynamic random access memory ("SDRAM") devices. However, a fewer or greater number of memory devices 148 may be used, and memory devices other than SDRAM devices may, of course, also be used. In the example illustrated in FIG. 1, the memory hubs 140 communicate over 4 independent memory channels 149 over the high-speed link 134. In this example, although not shown in FIG. 1, 4 memory hub controllers 128 are provided, each to receive data from one memory channel 149. A fewer or greater number of memory channels 149 may be used, however, in other examples. The memory hub 140 is coupled to each of the system memory devices 148 through a bus system 150, which normally includes a control bus, an address bus and a data bus.

Figure 2:
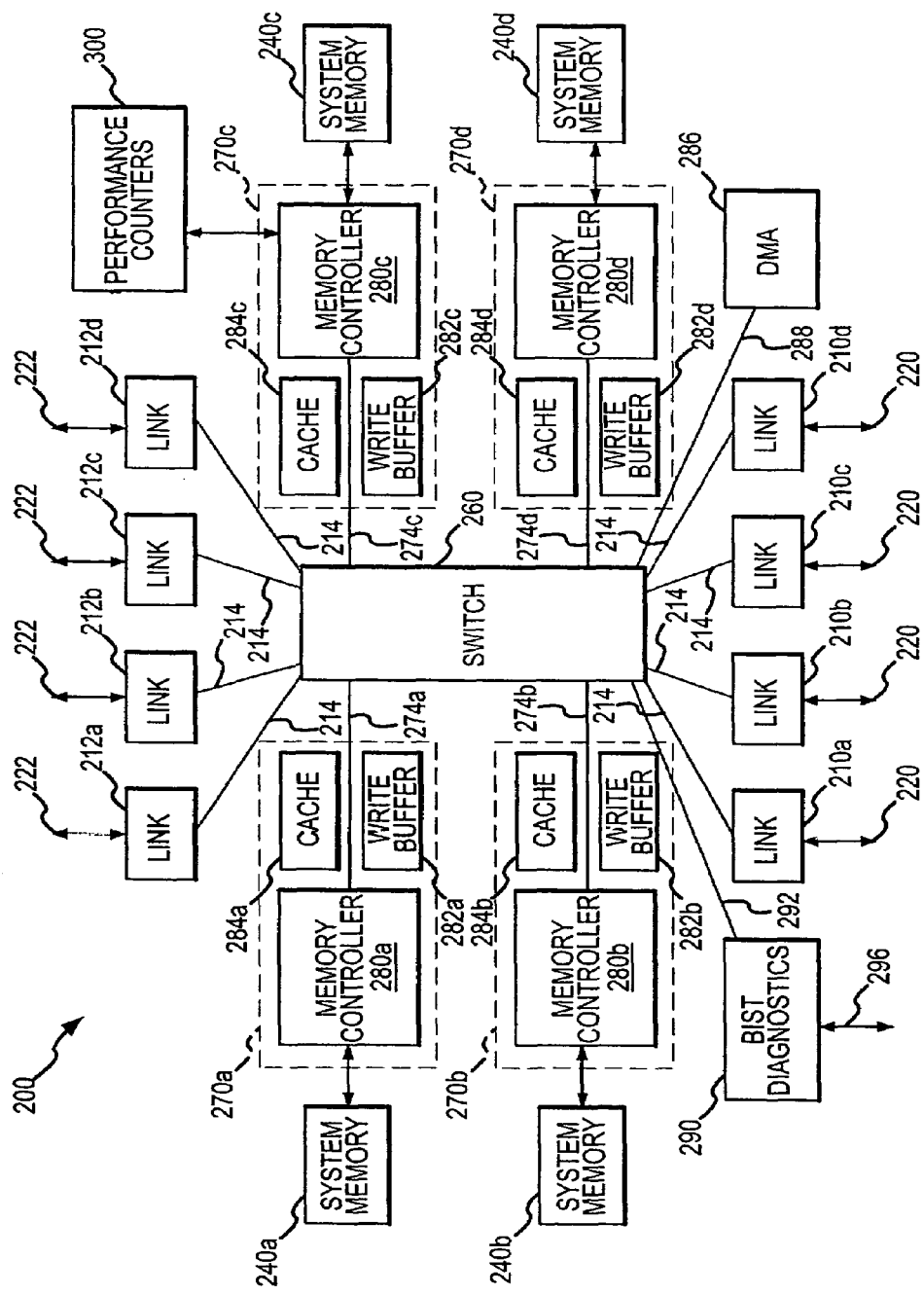
FIG. 2 is a block diagram of a memory hub used in the computer system of FIG. 1, which contains performance counters according to one example of the invention.

A memory hub 200 according to an embodiment of the present invention is shown in FIG. 2. The memory hub 200 can be substituted for the memory hub 140 of FIG. 1. The memory hub 200 is shown in FIG. 2 as being coupled to four memory devices 240a-d, which, in the present example are conventional SDRAM devices. In an alternative embodiment, the memory hub 200 is coupled to four different banks of memory devices, rather than merely four different memory devices 240a-d, with each bank typically having a plurality of memory devices. However, for the purpose of providing an example, the present description will be with reference to the memory hub 200 coupled to the four memory devices 240a-d. It will be appreciated that the necessary modifications to the memory hub 200 to accommodate multiple banks of memory is within the knowledge of those ordinarily skilled in the art.

Further included in the memory hub 200 are link interfaces 210a-d and 212a-d for coupling the memory module on which the memory hub 200 is located to a first high speed data link 220 and a second high speed data link 222, respectively. As previously discussed with respect to FIG. 1, the high speed data links 220, 222 can be implemented using an optical or electrical communication path or some other type of communication path. The link interfaces 210a-d, 212a-d are conventional, and include circuitry used for transferring data, command, and address information to and from the high speed data links 220, 222. As well known, such circuitry includes transmitter and receiver logic known in the art. It will be appreciated that those ordinarily skilled in the art have sufficient understanding to modify the link interfaces 210a-d, 212a-d to be used with specific types of communication paths, and that such modifications to the link interfaces 210a-d, 212a-d can be made without departing from the scope of the present invention. For example, in the event the high-speed data link 220, 222 is implemented using an optical communications path, the link interfaces 210a-d, 212a-d will include an optical input/output port that can convert optical signals coupled through the optical communications path into electrical signals.

The link interfaces 210a-d, 212a-d are coupled to the a switch 260 through a plurality of bus and signal lines, represented by busses 214. The busses 214 are conventional, and include a write data bus and a read data bus, although a single bi-directional data bus may alternatively be provided to couple data in both directions through the link interfaces 210a-d, 212a-d. It will be appreciated by those ordinarily skilled in the art that the busses 214 are provided by way of example, and that the busses 214 may include fewer or greater signal lines, such as further including a request line and a snoop line, which can be used for maintaining cache coherency.

The link interfaces 210a-d, 212a-d include circuitry that allow the memory hub 200 to be connected in the system memory in a variety of configurations. For example, the multi-drop arrangement, as shown in FIG. 1, can be implemented by coupling each memory module to the memory hub controller 128 through either the link interfaces 210a-d or 212a-d. Alternatively, a point-to-point, or daisy chain configuration can be implemented by coupling the memory modules in series. For example, the link interfaces 210a-d can be used to couple a first memory module and the link interfaces 212a-d can be used to couple a second memory module. The memory module coupled to a processor, or system controller, will be coupled thereto through one set of the link interfaces and further coupled to another memory module through the other set of link interfaces. In one embodiment of the present invention, the memory hub 200 of a memory module is coupled to the processor in a point-to-point arrangement in which there are no other devices coupled to the connection between the processor 104 and the memory hub 200. This type of interconnection provides better signal coupling between the processor 104 and the memory hub 200 for several reasons, including relatively low capacitance, relatively few line discontinuities to reflect signals and relatively short signal paths.

The switch 260 is further coupled to four memory interfaces 270a-d which are, in turn, coupled to the system memory devices 240a-d, respectively. By providing a separate and independent memory interface 270a-d for each system memory device 240a-d, respectively, the memory hub 200 avoids bus or memory bank conflicts that typically occur with single channel memory architectures. The switch 260 is coupled to each memory interface through a plurality of bus and signal lines, represented by busses 274. The busses 274 include a write data bus, a read data bus, and a request line. However, it will be understood that a single bi-directional data bus may alternatively be used instead of a separate write data bus and read data bus. Moreover, the busses 274 can include a greater or lesser number of signal lines than those previously described.

In an embodiment of the present invention, each memory interface 270a-d is specially adapted to the system memory devices 240a-d to which it is coupled. More specifically, each memory interface 270a-d is specially adapted to provide and receive the specific signals received and generated, respectively, by the system memory device 240a-d to which it is coupled. Also, the memory interfaces 270a-d are capable of operating with system memory devices 240a-d operating at different clock frequencies. As a result, the memory interfaces 270a-d isolate the processor 104 from changes that may occur at the interface between the memory hub 230 and memory devices 240a-d coupled to the memory hub 200, and it provides a more controlled environment to which the memory devices 240a-d may interface.

The switch 260 coupling the link interfaces 210a-d, 212a-d and the memory interfaces 270a-d can be any of a variety of conventional or hereinafter developed switches. For example, the switch 260 may be a cross-bar switch that can simultaneously couple link interfaces 210a-d, 212a-d and the memory interfaces 270a-d to each other in a variety of arrangements. The switch 260 can also be a set of multiplexers that do not provide the same level of connectivity as a cross-bar switch but nevertheless can couple the some or all of the link interfaces 210a-d, 212a-d to each of the memory interfaces 270a-d. The switch 260 may also includes arbitration logic (not shown) to determine which memory accesses should receive priority over other memory accesses. Bus arbitration performing this function is well known to one skilled in the art.

With further reference to FIG. 2, each of the memory interfaces 270a-d includes a respective memory controller 280, a respective write buffer 282, and a respective cache memory unit 284. The memory controller 280 performs the same functions as a conventional memory controller by providing control, address and data signals to the system memory device 240a-d to which it is coupled and receiving data signals from the system memory device 240a-d to which it is coupled. The write buffer 282 and the cache memory unit 284 include the normal components of a buffer and cache memory, including a tag memory, a data memory, a comparator, and the like, as is well known in the art. The memory devices used in the write buffer 282 and the cache memory unit 284 may be either DRAM devices, static random access memory ("SRAM") devices, other types of memory devices, or a combination of all three. Furthermore, any or all of these memory devices as well as the other components used in the cache memory unit 284 may be either embedded or stand-alone devices.

The write buffer 282 in each memory interface 270a-d is used to store write requests while a read request is being serviced. In a such a system, the processor 104 can issue a write request to a system memory device 240a-d even if the memory device to which the write request is directed is busy servicing a prior write or read request. Using this approach, memory requests can be serviced out of order since an earlier write request can be stored in the write buffer 282 while a subsequent read request is being serviced. The ability to buffer write requests to allow a read request to be serviced can greatly reduce memory read latency since read requests can be given first priority regardless of their chronological order. For example, a series of write requests interspersed with read requests can be stored in the write buffer 282 to allow the read requests to be serviced in a pipelined manner followed by servicing the stored write requests in a pipelined manner. As a result, lengthy settling times between coupling write request to the memory devices 270a-d and subsequently coupling read request to the memory devices 270a-d for alternating write and read requests can be avoided.

The use of the cache memory unit 284 in each memory interface 270a-d allows the processor 104 to receive data responsive to a read command directed to a respective system memory device 240a-d without waiting for the memory device 240a-d to provide such data in the event that the data was recently read from or written to that memory device 240a-d. The cache memory unit 284 thus reduces the read latency of the system memory devices 240a-d to maximize the memory bandwidth of the computer system. Similarly, the processor 104 can store write data in the cache memory unit 284 and then perform other functions while the memory controller 280 in the same memory interface 270a-d transfers the write data from the cache memory unit 284 to the system memory device 240a-d to which it is coupled.

Further included in the memory hub 200 is a built in self-test (BIST) and diagnostic engine 290 coupled to the switch 260 through a diagnostic bus 292. The diagnostic engine 290 is further coupled to a maintenance bus 296, such as a System Management Bus (SMBus) or a maintenance bus according to the Joint Test Action Group (JTAG) and IEEE 1149.1 standards. Both the SMBus and JTAG standards are well known by those ordinarily skilled in the art. Generally, the maintenance bus 296 provides a user access to the diagnostic engine 290 in order to perform memory channel and link diagnostics. For example, the user can couple a separate PC host via the maintenance bus 296 to conduct diagnostic testing or monitor memory system operation. By using the maintenance bus 296 to access diagnostic test results, issues related to the use of test probes, as previously discussed, can be avoided. It will be appreciated that the maintenance bus 296 can be modified from conventional bus standards without departing from the scope of the present invention. It will be further appreciated that the diagnostic engine 290 should accommodate the standards of the maintenance bus 296, where such a standard maintenance bus is employed. For example, the diagnostic engine should have an maintenance bus interface compliant with the JTAG bus standard where such a maintenance bus is used.

Further included in the memory hub 200 is a DMA engine 286 coupled to the switch 260 through a bus 288. The DMA engine 286 enables the memory hub 200 to move blocks of data from one location in the system memory to another location in the system memory without intervention from the processor 104. The bus 288 includes a plurality of conventional bus lines and signal lines, such as address, control, data busses, and the like, for handling data transfers in the system memory. Conventional DMA operations well known by those ordinarily skilled in the art can be implemented by the DMA engine 286. A more detailed description of a suitable DMA engine can be found in commonly assigned, co-pending U.S. patent application Ser. No. 10/625,132, entitled APPARATUS AND METHOD FOR DIRECT MEMORY ACCESS IN A HUB-BASED MEMORY SYSTEM, filed on Jul. 22, 2003, which is incorporated herein by reference. As described in more detail in the aforementioned patent application, the DMA engine 286 is able to read a link list in the system memory to execute the DMA memory operations without processor intervention, thus, freeing the processor 104 and the bandwidth limited system bus from executing the memory operations. The DMA engine 286 can also include circuitry to accommodate DMA operations on multiple channels, for example, for each of the system memory devices 240a-d. Such multiple channel DMA engines are well known in the art and can be implemented using conventional technologies.

The diagnostic engine 290 and the DMA engine 286 are preferably embedded circuits in the memory hub 200. However, including separate a diagnostic engine and a separate DMA device coupled to the memory hub 200 is also within the scope of the present invention.

Embodiments of the present invention provide performance monitoring components in communication with one or more of the memory controllers 280. The performance monitoring components allow the memory controllers 280 to dynamically adjust methods used to send and receive data from the memory units 240. In the example illustrated in FIG. 2, at least one performance counter 300 is provided in communication with the memory controllers 280, as is described further below.

The performance counters 300 track one or more metrics associated with memory access and/or performance of memory hub 200, including for example, page hit rate, number or percentage of prefetch hits, and cache hit rate or percentage, in one example of the invention.

Figure 3:
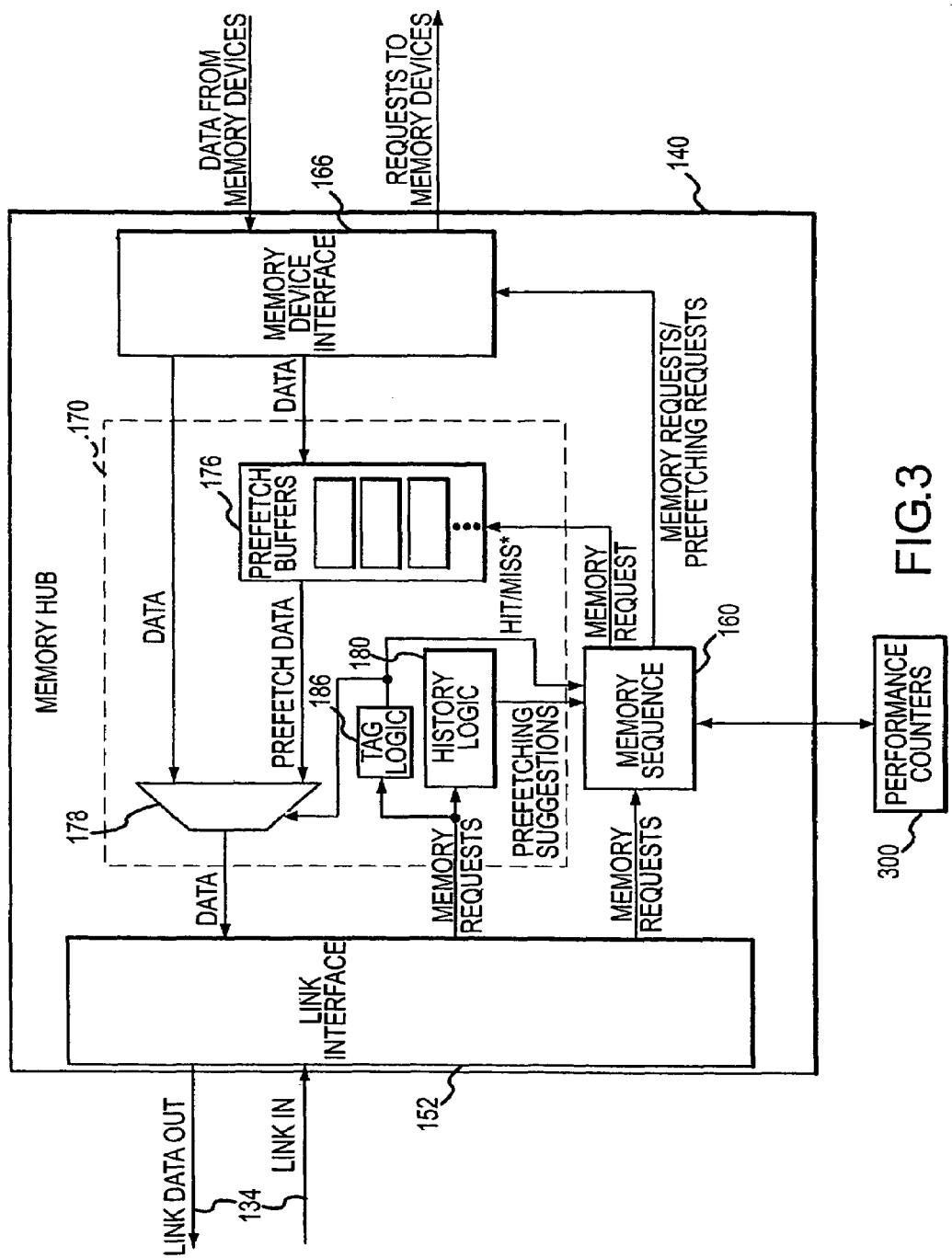
FIG. 3 is a block diagram of a memory hub used in the computer system of FIG. 1, which contains prefetch buffers according to one example of the invention.

As described above, one approach to reducing latency in memory devices is to prefetch data. One example of the memory hub 140 of FIG. 1 having prefetch buffers is shown in FIG. 3 and described further in commonly assigned, co-pending U.S. patent application Ser. No. 10/601,252, entitled MEMORY HUB AND ACCESS METHOD HAVING INTERNAL PREFETCH BUFFERS, filed on Jun. 20, 2003, which is incorporated herein by reference. As described in the aforementioned patent application, the memory hub 140 includes a link interface 152 that is coupled to the high-speed link 134. The link interface 152 may include a variety of conventional interface circuitry such as, for example, a first-in, first-out buffer (not shown), for receiving and storing memory requests as they are received through the high-speed link 134. The memory requests can then be stored in the link interface until they can be processed by the memory hub 140.

A memory request received by the link interface 152 is processed by first transferring the request to a memory sequencer 160, which is included in one or more of memory controllers 270a-d in FIG. 2, and is in communication with one or more performance counters 300. The memory sequencer 160 converts the memory requests from the format output from the system controller 110 (FIG. 1) into a memory request having a format that can be used by the memory devices 148. These reformatted request signals will normally include memory command signals, which are derived from memory commands contained in the memory request received by the memory hub 140, and row and column address signals, which are derived from an address contained in the memory request received by the memory hub 140. In the event the memory request is a write memory request, the re-formatted request signals will normally include write data signals which are derived from write data contained in the memory request received by the memory hub 140. For example, where the memory devices 148 are conventional DRAM devices, the memory sequencer 160 will output row address signals, a row address strobe ("RAS") signal, an active low write/active high read signal ("W*/R"), column address signals and a column address strobe ("CAS") signal. The re-formatted memory requests are preferably output from the sequencer 160 in the order they will be used by the memory devices 148.

The memory sequencer 160 applies the reformatted memory requests to a memory device interface 166. The memory device interface 166, like the link interface 152, may include a FIFO buffer (not shown), for receiving and storing one or more memory requests as they are received from the link interface 152.

In the event the memory device interface 166 stores several memory requests until they can be processed by the memory devices 148, the memory device interface 166 may re-order the memory requests so that they are applied to the memory devices 148 in some other order. For example, the memory requests may be stored in the interface 166 in a manner that causes one type of request, e.g., read requests, to be processed before other types of requests, e.g., write requests.

As previously explained, one of the disadvantages of using memory hubs is the increased latency they can sometimes create. As also previously explained, prefetch approaches that are traditionally used to reduce memory read latency are not well suited to a memory system using memory hubs. In contrast, the memory hub 140 shown in FIG. 3 provides relatively low memory read latency by including a prefetch system 170 in the memory hub 140 that correctly anticipates which data will be needed during execution of a program, and then prefetches those data and stores them in one or more buffers that are part of the prefetch system 170. The prefetch system 170 includes several prefetch buffers 176, the number of which can be made variable depending upon operating conditions, as explained in greater detail below and in the aforementioned patent application. Briefly, the prefetch buffers 176 receive prefetched data from the memory device interface 166. The data are stored in the prefetch buffers 176 so that they will be available for a subsequent memory access. The data are then coupled through a multiplexer 178 to the link interface 152.

The prefetch system 170 also includes history logic 180 that receives the memory requests from the link interface 152. The history logic 180 analyzes the memory request using conventional algorithms to detect a pattern or stride from which future memory requests can be predicted. Although data may be prefetched from any address in the memory devices 148, the data are preferably prefetched only from rows in the memory devices 148 that are currently active or "open" so that the prefetching will not require a row of memory cells in the memory devices 148 to be precharged. In one example, one or more performance counter 300 tracks the number or percentage of page hits. The memory sequencer 160 adjusts the number of active or "open" pages based on information supplied by one or more performance counters 300, illustrated in FIG. 2. In one example of the invention, the number of open pages is reduced by the memory sequencer 160 when the page hit count and/or page hit percentage tracked by at least one performance counter 300 falls below a threshold value. In an analogous manner, in one example, the number of open pages is increased when the page hit count or page hit percentage exceeds a threshold value. Of course, other methods of adjusting the number of open pages are used in other examples of the invention.

The memory sequencer 160 may also selectively enable or disable prefetching depending on information supplied by one or more of the performance counters 300, such as page hit rate, percentage of prefetch hits, and the like. However, prefetching may also be enabled all of the time. In one example, the memory sequencer 300 disables prefetching when the number of prefetch hits and/or the page hit rate decreases below a threshold value. Alternatively, the sequencer 160 may enable or disable prefetching based on the percentage of memory requests that result in reading the requested data from the prefetch buffers 176 rather than from the memory devices 148.

When a memory module 130 containing a memory hub 140 receives a read memory request, it first determines whether or not the data or instruction called for by the request is stored in the prefetch buffers 176. This determination is made by coupling the memory request to tag logic 186. The tag logic 186 receives prefetch addresses from the history logic 180 corresponding to each prefetch suggestion. Alternatively, the tag logic 186 could receive prefetch addresses from the memory sequencer 160 corresponding to each prefetch request coupled to the memory device interface 166. Other means could also be used to allow the tag logic 186 to determine if data called for by a memory read request are stored in the prefetch buffer 176. In any case, the tag logic 186 stores the prefetch addresses to provide a record of the data that have been stored in the prefetch buffers 176. Using conventional techniques, the tag logic 186 compares the address in each memory request received from the link interface 152 with the prefetch addresses stored in the tag logic 186 to determine if the data called for by the memory request are stored in the prefetch buffers 176.

If the Tag Logic 186 determines that the data called for by a memory request are not stored in the prefetch buffers 176, it couples a low HIT/MISS* signal to the memory sequencer 160. If the Tag Logic 186 determines the data called for by a memory request are stored in the prefetch buffers 176, it couples a high HIT/MISS* signal to the memory sequencer 160. In one example, the incidences of high and/or low HIT/MISS* signals are counted by one or more performance counters 300 to track the number of hits over the number of overall memory requests.

In one example, the performance counters 300, illustrated in FIG. 3, track page hit rate over time. The page hit rate is then communicated to the memory sequencer 160 to adjust the number of open pages and/or to switch to an automatic precharge mode, where a requested line will automatically be precharged. In another example, the percentage of prefetch hits are tracked by the performance counters 300 to adjust whether prefetching is enabled and/or the number of prefetch requests to issue. In one example, at least one performance counter 300 tracks the number of cache hits, that is requests to caches 284a-d, where the requested data is located in the cache. If the cache hit rate is too low, the cache can be disabled, for example.

In one example, programmable thresholds are used to establish whether to use auto-precharge mode, number of open pages for page mode, number of prefetch requests and cacheability. In one example, the duration of monitoring by one or more performance counters 300 is programmable. The memory bus can be monitored for seconds, hours, or days, in various examples, to obtain the results or reset the counters. From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory module, comprising:
    at least one memory device; and
    a memory hub, comprising:
        a link interface operable to receive memory requests for access to memory cells in the at least one memory device;
        a memory device interface coupled to the at least one memory device, the memory device interface being operable to couple memory requests received by the link interface to the at least one memory device for access to memory cells in the at least one memory device and to receive read data responsive to at least some of the memory requests;

a performance determining device coupled to the memory device interface, the performance determining device operable to track at least one performance metric; and a performance adjuster operable to adjust operability of the memory device or memory hub responsive to the performance metric tracked by the performance determining device.

2. The memory module of claim 1 wherein the link interface comprises an optical input/output port.

3. The memory module of claim 1 wherein the performance metric tracked by the performance determining device comprises at least one performance metric selected from the group consisting of page hit rate, prefetch hits, and cache hit rate.

4. The memory module of claim 3 wherein the performance determining device is operable to track page hit rate, and the performance adjuster is operable to change a number of open pages in the at least one memory device.

5. The memory module of claim 3 wherein the performance determining device is operable to track page hit rate, and the performance adjuster is operable to switch to auto-precharge mode.

6. The memory module of claim 3 wherein the performance determining device is operable to track a percentage of prefetch hits, and the performance adjuster is operable to enable prefetching or disable prefetching.

7. The memory module of claim 3 wherein the performance determining device is operable to track a percentage of prefetch hits, and the performance adjuster is operable to determine a number of prefetch requests.

8. The memory module of claim 3 wherein the performance determining device is operable to track a cache hit rate, and the performance adjuster is operable to disable the cache.

9. A memory hub, comprising:

a link interface receiving memory requests;

a memory device interface operable to transmit memory requests received by the link interface and to receive read data responsive to at least some of the memory requests;

a performance determining device coupled to the memory device interface, the performance determining device operable to track at least one performance metric; and a performance adjuster coupled to the performance determining device and the memory device interface, the performance adjuster being operable to cause the memory device interface to output memory device operability adjustment commands responsive to the performance metric tracked by the performance determining device.

10. The memory hub of claim 9 wherein the performance metric tracked by the performance determining device comprises at least one performance metric selected from the group consisting of page hit rate, prefetch hits, and cache hit rate.

11. The memory hub of claim 10 wherein the performance determining device is operable to track page hit rate, and the performance adjuster is operable to change a number of open pages in the memory device.

12. The memory hub of claim 10 wherein the performance determining device is operable to track page hit rate, and the performance adjuster is operable to switch to auto-precharge mode.

13. The memory hub of claim 10 wherein the performance determining device is operable to track a percentage of prefetch hits, and the performance adjuster is operable to enable prefetching or disable prefetching.

14. The memory hub of claim 10 wherein the performance determining device is operable to track a percentage of prefetch hits, and the performance adjuster is operable to determine a number of prefetch requests.

15. The memory hub of claim 10 wherein the performance determining device is operable to track a cache hit rate, and the performance adjuster is operable to disable the cache.

16. A processor-based system, comprising:

a processor;

a controller coupled to the processor, the controller having an input port and an output port;

an input device coupled to the processor;

an output device coupled to the processor;

a storage device coupled to the processor;

a plurality of memory modules, each of the memory modules comprising:

at least one memory device; and a memory hub, comprising:

a link interface operable to receive memory requests for access to memory cells in the at least one memory device;

a memory device interface coupled to the at least one memory device, the memory device interface being operable to couple memory requests received by the link interface to the at least one memory device for access to memory cells in the at least one memory device and to receive read data responsive to at least some of the memory requests;

a performance determining device coupled to the memory device interface, the performance determining device operable to track at least one performance metric; and a performance adjusting device operable to adjust operability of the processor, controller, at least one memory device or memory hub responsive to the performance metric tracked by the performance determining device.

17. The processor-based system of claim 16 wherein the performance metric tracked by the performance determining device comprises at least one performance metric selected from the group consisting of page hit rate, prefetch hits, and cache hit rate.

18. The processor-based system of claim 17 wherein the performance determining device is operable to track page hit rate, and the performance adjusting device is operable to change a number of open pages in the memory device.

19. The processor-based system of claim 17 wherein the performance determining device is operable to track page hit rate, and the performance adjusting device is operable to switch to auto-precharge mode.

20. The processor-based system of claim 17 wherein the performance determining device is operable to track a percentage of prefetch hits, and the performance adjusting device is operable to enable prefetching or disable prefetching.

21. The processor-based system of claim 17 wherein the performance determining device is operable to track a percentage of prefetch hits, and the performance adjusting device is operable to determine a number of prefetch requests.

22. The processor-based system of claim 17 wherein the performance determining device is operable to track a cache hit rate, and the performance adjusting device is operable to disable the cache.

23. A method of reading data from a memory module, comprising:

receiving memory requests for access to at least one memory device mounted on the memory module;

coupling the memory requests to the at least one memory device responsive to the received memory request, at least some of the memory requests being memory requests to read data;

receiving read data responsive to at least some of the read memory requests;

tracking at least one performance metric of the memory module; and adjusting the operability of the at least one memory device responsive to the tracked performance metric.

24. The method of claim 23 wherein the act of tracking at least one performance metric of the memory module comprises tracking at least one performance metric selected from the group consisting of page hit rate, prefetch hits, and cache hit rate.

25. The method of claim 23, further comprising adjusting operability of the memory module based on the tracked performance metric.

26. The method of claim 23 wherein the tracked performance metric comprises page hit rate.

27. The method of claim 23 wherein the tracked performance metric comprises cache hit rate.

28. The method of claim 23 wherein the tracked performance metric comprises a percentage of prefetch hits.

* * * * *

UNITED STATES PATENT AND TRADEMARK OFFICE
CERTIFICATE OF CORRECTION

PATENT NO.        : 7,562,178 B2                                    Page 1 of 1
APPLICATION NO. : 12/069197
DATED             : July 14, 2009
INVENTOR(S)       : Joseph M. Jeddeloh It is certified that error appears in the above-identified patent and that said Letters Patent is hereby corrected as shown below:

In column 12, lines 30-31, in Claim 16, delete "determing" and insert -- determining --, therefor.

Signed and Sealed this

Fifteenth Day of September, 2009

David J. Kappos
*Director of the United States Patent and Trademark Office*